United States Patent
Choure et al.

(10) Patent No.: US 12,307,194 B2
(45) Date of Patent: May 20, 2025

(54) METHOD AND APPARATUS FOR A REPORT CONNECTOR

(71) Applicant: Rakuten Symphony, Inc., Tokyo (JP)

(72) Inventors: Vipul Choure, Indore (IN); Piyush Patel, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 17/923,852

(22) PCT Filed: May 23, 2022

(86) PCT No.: PCT/US2022/030471
§ 371 (c)(1),
(2) Date: Nov. 7, 2022

(87) PCT Pub. No.: WO2023/229569
PCT Pub. Date: Nov. 30, 2023

(65) Prior Publication Data
US 2024/0220716 A1    Jul. 4, 2024

(51) Int. Cl.
*G06F 40/186* (2020.01)
*G06F 21/62* (2013.01)

(52) U.S. Cl.
CPC ........ *G06F 40/186* (2020.01); *G06F 21/6218* (2013.01)

(58) Field of Classification Search
CPC .... G06F 40/186; G06F 21/6218; G06Q 10/10
See application file for complete search history.

(56) References Cited

U.S. PATENT DOCUMENTS

| | | | |
|---|---|---|---|
| 2006/0001666 A1 | 1/2006 | Cake et al. | |
| 2007/0038683 A1* | 2/2007 | Dixon | G06Q 10/06 |
| 2014/0236663 A1* | 8/2014 | Smith | G06Q 10/0633 |
| | | | 705/7.27 |
| 2017/0116426 A1 | 4/2017 | Pattabhiraman et al. | |
| 2023/0289691 A1* | 9/2023 | Sabourin | G06Q 10/0639 |

OTHER PUBLICATIONS

International Search Report of PCT/US2022/030471 dated Sep. 23, 2022 [PCT/ISA/210].
Written Opinion of PCT/US2022/030471 dated Sep. 23, 2022 [PCT/ISA/237].

* cited by examiner

*Primary Examiner* — Angie Badawi
(74) *Attorney, Agent, or Firm* — Sughrue Mion, PLLC

(57) ABSTRACT

Provided herein are methods, apparatuses, systems, and computer-readable storage media for generating a report by a workflow management service (WMS) of a business intelligence (BI) platform. In an embodiment, a method includes determining, based on a workflow of the BI platform, that the report is to be generated. The method further includes obtaining a report connector configuration corresponding to the report. The method further includes identifying a report template corresponding to the report connector configuration. The method further includes customizing the report template using the report connector configuration, resulting in a customized report template. The method further includes instructing a first service to generate the report using the customized report template. The method further includes reporting a progress status of the report based on request response information received from the first service.

20 Claims, 9 Drawing Sheets

FIG. 6

METHOD AND APPARATUS FOR A REPORT CONNECTOR

CROSS REFERENCE TO RELATED APPLICATIONS

This application is a National Stage of International Application No. PCT/US2022/030471 filed on May 23, 2022.

TECHNICAL FIELD

The present disclosure relates to business intelligence (BI) systems, and particularly to methods and apparatuses for automatically generating a report during execution of a workflow.

BACKGROUND

Related business intelligence (BI) systems and/or platforms may be used to identify, process, and/or analyze business data. Alternatively or additionally, the related BI systems (or platforms) may comprise integration tools to analyze and generate workflows based on enterprise systems of a business entity. These integration tools may be used across a wide range of business areas, such as finance, human resources, marketing, sales, provisioning, customer service, supply management, for example. Alternatively or additionally, these BI tools may be used by business entities across many different industries (e.g., telecommunications industry). These BI tools may provide users of the BI systems and/or platforms with a user interface (UI) with which to select and configure tasks and/or arrange the tasks in an execution sequence for one or more workflows. That is, BI users may automate a business process by creating one or more workflows that execute a series of tasks in a particular order to generate a desired output and/or result.

Related BI systems and platforms may not natively support automatic generation of a report during the execution of a workflow. A report may provide graphical and/or text-based information related to the status of the workflow execution and/or provide results generated by the workflow up to that point. That is, at best, a BI user may manually generate a report by stopping the execution of the workflow to manually generate the report, and/or by waiting until the completion of the workflow to manually generate the report. Alternatively or additionally, the BI user may need to provide information to identify the report and/or to identify one or more sources of data to be included in the report each time the BI user manually generates the report.

Thus, there exists a need for improvements in report generation in BI systems and/or platforms. In particular, there is a need for methods and apparatuses for generating a report by a workflow management service (WMS) of a BI platform. Improvements are presented herein. While the examples described herein may typically be applicable to the telecommunications industry, these improvements may also be applicable to other industries that use BI systems and/or platforms.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

Methods, apparatuses, and non-transitory computer-readable mediums for generating a report by a workflow management service (WMS) of a business intelligence (BI) platform are disclosed by the present disclosure.

According to an aspect of the disclosure, a method of generating a report by a WMS of a BI platform includes determining, by a processor and based on a workflow of the BI platform, that the report is to be generated. The method further includes obtaining, by the processor, a report connector configuration corresponding to the report. The method further includes identifying, by the processor, a report template corresponding to the report connector configuration. The method further includes customizing, by the processor, the report template using the report connector configuration, resulting in a customized report template. The method further includes instructing, by the processor, a first service to generate the report using the customized report template. The method further includes reporting, by the processor, a progress status of the report based on request response information received from the first service.

According to some embodiments of the disclosure, the determining that the report is to be generated includes receiving, from a client device, a request to execute the workflow of the BI platform, the workflow comprising a report connector task corresponding to the report connector configuration.

According to some embodiments of the disclosure, the method further includes assigning access permissions to the report according to access permissions indicated by the report connector configuration.

According to some embodiments of the disclosure, the instructing of the first service to generate the report includes instructing a second service to store the report in a managed document storage.

According to some embodiments of the disclosure, the method further includes permitting, to an authorized user, access to the report stored in the managed document storage, the authorized user being determined according to access permissions indicated by the report connector configuration.

According to some embodiments of the disclosure, the method further includes displaying, via a workflow design user interface (UI) of the BI platform, a report connector configuration UI. The method further includes obtaining, via the report connector configuration UI, the report connector configuration associated with the report, the report connector configuration comprising at least one of an indication of a selected report template, a base report name, one or more separator and suffix pairs to be appended to the base report name, a report extension type, one or more report access permissions, and one or more report variable mappings.

According to some embodiments of the disclosure, the method further includes providing, via the report connector configuration UI, a report template list indicating report templates that are available to the workflow of the BI platform. The method further includes receiving, via the report connector configuration UI, the indication of the selected report template from among the report templates indicated by the report template list. The method further includes providing, via the report connector configuration UI, a report variable list indicating report variables of the selected report template, and corresponding lists of candidate report variable values for each report variable in the report variable list. The method further includes mapping each report variable of the report variable list with a corresponding variable value from among the corresponding list of candidate report variable values, according to one or more selections received via the report connector configuration UI.

According to another aspect of the disclosure, an apparatus for generating a report by a WMS of a BI platform includes a memory storage storing computer-executable instructions, and a processor communicatively coupled to the memory storage. The processor is configured to execute the computer-executable instructions and cause the apparatus to determine, based on a workflow of the BI platform, that the report is to be generated. The computer-executable instructions further cause the apparatus to obtain a report connector configuration corresponding to the report. The computer-executable instructions further cause the apparatus to identify a report template corresponding to the report connector configuration. The computer-executable instructions further cause the apparatus to customize the report template using the report connector configuration, resulting in a customized report template. The computer-executable instructions further cause the apparatus to instruct a first service to generate the report using the customized report template. The computer-executable instructions further cause the apparatus to report a progress status of the report based on request response information received from the first service.

According to another aspect of the disclosure, a non-transitory computer-readable storage medium has recorded thereon a program for generating a report that is executable by a WMS of a BI platform. The program includes operations to determine, based on a workflow of the BI platform, that the report is to be generated. The program includes further operations to obtain a report connector configuration corresponding to the report. The program includes further operations to identify a report template corresponding to the report connector configuration. The program includes further operations to customize the report template using the report connector configuration, resulting in a customized report template. The program includes further operations to instruct a first service to generate the report using the customized report template. The program includes further operations to report a progress status of the report based on request response information received from the first service.

Additional embodiments will be set forth in the description that follows and, in part, will be apparent from the description, and/or may be learned by practice of the presented embodiments of the disclosure.

BRIEF DESCRIPTION OF THE DRAWINGS

The above and other aspects, features, and aspects of embodiments of the disclosure will be apparent from the following description taken in conjunction with the accompanying drawings, in which:

FIG. 6 is an example of a report connector configuration user interface (UI), in accordance with various embodiments of the present disclosure;

DETAILED DESCRIPTION

Figure 1:
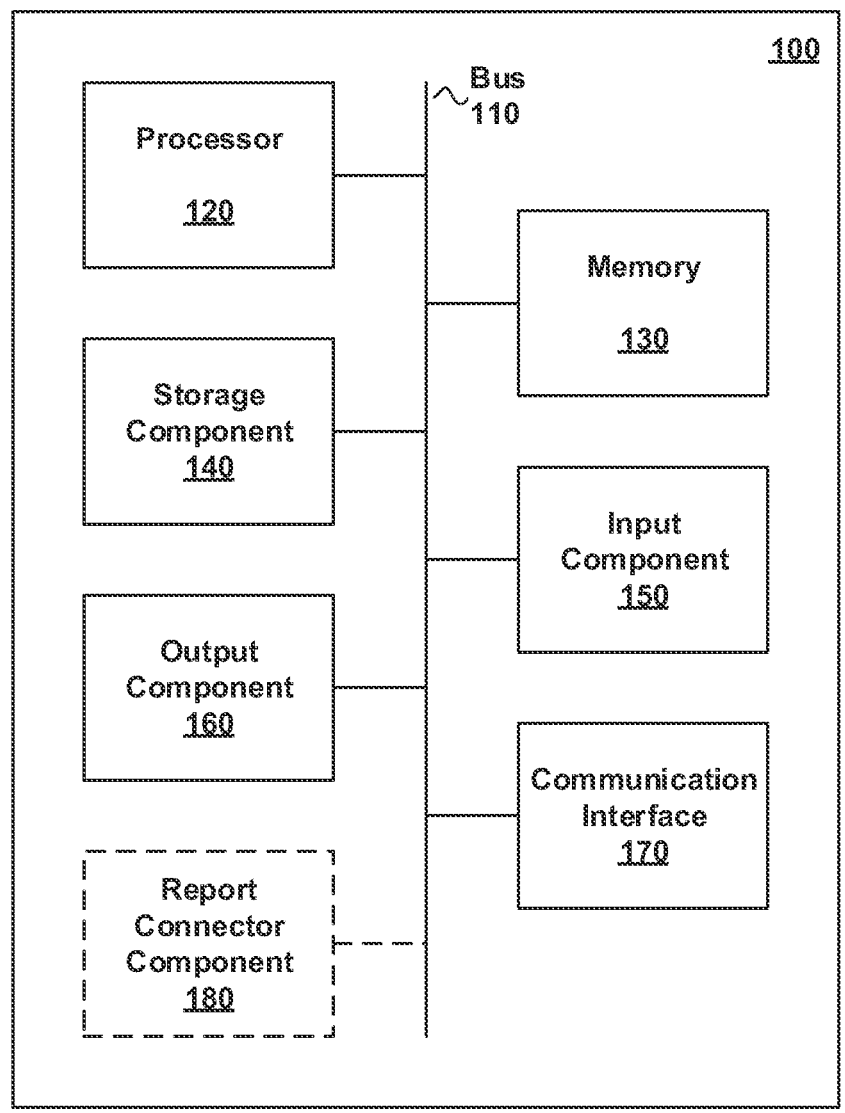
FIG. 1 is a diagram of an example device for generating a report by a workflow management service (WMS) of a business intelligence (BI) platform, in accordance with various embodiments of the present disclosure.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

Related business intelligence (BI) systems and/or platforms may comprise one or more BI integration tools. These BI integration tools may provide BI users with the ability to create, configure, and/or execute workflows that may automate business processes. For example, the BI integration tools may provide a user interface (UI) (e.g., graphical UI (GUI)) with which the BI users may add, configure, and/or remove tasks from a workflow. Alternatively or additionally, the BI users may arrange the tasks in a particular execution sequence in order to generate a desired output and/or result.

However, these related BI systems and/or platforms may not provide native support for automatically generating a report during execution of a workflow. For example, if or when a BI user needs to generate a particular report during an intermediate point in the execution of the workflow, the BI user may need to pause execution of the workflow, manually generate the report, and resume execution of the workflow. Moreover, the BI user may need to provide information to identify the report and/or to identify one or more sources of data to be included in the report each time the report is manually generated.

Aspects presented herein provide methods and apparatuses for automatically generating a report using a report connector component added to a workflow management service (WMS) of a BI system and/or platform. The report connector component may allow BI users to add and/or configure a report generation task to a workflow that may cause the WMS to automatically generate the report, customized according to the pre-defined report configuration, during execution of a workflow. Further, aspects presented herein may reduce complexity and improve efficiency of generating reports for automated workflows using the BI system and/or platform.

FIG. 1 is diagram of an example device for generating a report by a WMS of a BI platform. Device 100 may correspond to any type of known computer, server, or data processing device. For example, the device 100 may comprise a processor, a personal computer (PC), a printed circuit board (PCB) comprising a computing device, a mini-computer, a mainframe computer, a microcomputer, a telephonic computing device, a wired/wireless computing device (e.g., a smartphone, a personal digital assistant (PDA)), a laptop, a tablet, a smart device, a wearable device, or any other similar functioning device.

In some embodiments, as shown in FIG. 1, the device 100 may include a set of components, such as a processor 120, a memory 130, a storage component 140, an input component 150, an output component 160, a communication interface 170, and a report connector component 180. The set of components of the device 100 may be communicatively coupled via a bus 110.

The bus 110 may comprise one or more components that permit communication among the set of components of the device 100. For example, the bus 110 may be a communication bus, a cross-over bar, a network, or the like. Although the bus 110 is depicted as a single line in FIG. 1, the bus 110 may be implemented using multiple (two or more) connections between the set of components of device 100. The disclosure is not limited in this regard.

The device 100 may comprise one or more processors, such as the processor 120. The processor 120 may be implemented in hardware, firmware, and/or a combination of hardware and software. For example, the processor 120 may comprise a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), a general purpose single-chip or multi-chip processor, or other programmable logic device, discrete gate or transistor logic, discrete hardware components, or any combination thereof designed to perform the functions described herein. A general purpose processor may be a microprocessor, or any conventional processor, controller, microcontroller, or state machine. The processor 120 also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function.

The processor 120 may control overall operation of the device 100 and/or of the set of components of device 100 (e.g., the memory 130, the storage component 140, the input component 150, the output component 160, the communication interface 170, the report connector component 180).

The device 100 may further comprise the memory 130. In some embodiments, the memory 130 may comprise a random access memory (RAM), a read only memory (ROM), an electrically erasable programmable ROM (EEPROM), a flash memory, a magnetic memory, an optical memory, and/or another type of dynamic or static storage device. The memory 130 may store information and/or instructions for use (e.g., execution) by the processor 120.

The storage component 140 of device 100 may store information and/or computer-readable instructions and/or code related to the operation and use of the device 100. For example, the storage component 140 may include a hard disk (e.g., a magnetic disk, an optical disk, a magneto-optic disk, and/or a solid state disk), a compact disc (CD), a digital versatile disc (DVD), a universal serial bus (USB) flash drive, a Personal Computer Memory Card International Association (PCMCIA) card, a floppy disk, a cartridge, a magnetic tape, and/or another type of non-transitory computer-readable medium, along with a corresponding drive.

The device 100 may further comprise the input component 150. The input component 150 may include one or more components that permit the device 100 to receive information, such as via user input (e.g., a touch screen, a keyboard, a keypad, a mouse, a stylus, a button, a switch, a microphone, a camera, and the like). Alternatively or additionally, the input component 150 may include a sensor for sensing information (e.g., a global positioning system (GPS) component, an accelerometer, a gyroscope, an actuator, and the like).

The output component 160 of device 100 may include one or more components that may provide output information from the device 100 (e.g., a display, a liquid crystal display (LCD), light-emitting diodes (LEDs), organic light emitting diodes (OLEDs), a haptic feedback device, a speaker, and the like).

The device 100 may further comprise the communication interface 170. The communication interface 170 may include a receiver component, a transmitter component, and/or a transceiver component. The communication interface 170 may enable the device 100 to establish connections and/or transfer communications with other devices (e.g., a server, another device). The communications may be effected via a wired connection, a wireless connection, or a combination of wired and wireless connections. The communication interface 170 may permit the device 100 to receive information from another device and/or provide information to another device. In some embodiments, the communication interface 170 may provide for communications with another device via a network, such as a local area network (LAN), a wide area network (WAN), a metropolitan area network (MAN), a private network, an ad hoc network, an intranet, the Internet, a fiber optic-based network, a cellular network (e.g., a fifth generation (5G) network, a long-term evolution (LTE) network, a third generation (3G) network, a code division multiple access (CDMA) network, and the like), a public land mobile network (PLMN), a telephone network (e.g., the Public Switched Telephone Network (PSTN)), or the like, and/or a combination of these or other types of networks. Alternatively or additionally, the communication interface 170 may provide for communications with another device via a device-to-device (D2D) communication link, such as FlashLinQ, WiMedia, Bluetooth, ZigBee, Wi-Fi, LTE, 5G, and the like. In other embodiments, the communication interface 170 may include an Ethernet interface, an optical interface, a coaxial interface, an infrared interface, a radio frequency (RF) interface, or the like.

In some embodiments, the device 100 may comprise the report connector component 180 configured to automatically generate a report during execution of a workflow by a WMS of a BI system and/or platform. For example, the report connector component 180 may be configured to determine that a report is to be generated, obtain a report connector configuration corresponding to the report, identify a report template corresponding to the report connector configuration, customize the report template using the report connector configuration, instructing a first service to generate the report using the customized report template, and report a progress status of the report based on request response information received from the first service.

The device 100 may perform one or more processes described herein. The device 100 may perform operations based on the processor 120 executing computer-readable instructions and/or code that may be stored by a non-transitory computer-readable medium, such as the memory 130 and/or the storage component 140. A computer-readable medium may refer to a non-transitory memory device. A memory device may include memory space within a single physical storage device and/or memory space spread across multiple physical storage devices.

Computer-readable instructions and/or code may be read into the memory 130 and/or the storage component 140 from another computer-readable medium or from another device via the communication interface 170. The computer-readable instructions and/or code stored in the memory 130 and/or storage component 140, if or when executed by the processor 120, may cause the device 100 to perform one or more processes described herein.

Alternatively or additionally, hardwired circuitry may be used in place of or in combination with software instructions to perform one or more processes described herein. Thus, embodiments described herein are not limited to any specific combination of hardware circuitry and software.

The number and arrangement of components shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Additionally or alternatively, a set of (one or more) components shown in FIG. 1 may perform one or more functions described as being performed by another set of components shown in FIG. 1.

A workflow of a WMS of a BI system and/or platform may present several use cases in which a report may need to be generated. For example, a workflow may require a report to be generated at or near the beginning of the execution flow of the workflow to record and/or save an initial configuration, an initial state, and/or other initial information prior to possible modification by the execution of the workflow. In another example, a workflow may require a report to be generated at or near the end of the execution flow of the workflow to record and/or save a final configuration, a final state, and/or other results that may have been created and/or modified by the execution of the workflow. In yet another example, a workflow may require a report to be generated at another point during the execution flow of the workflow to record and/or save an intermediate configuration, an intermediate state, and/or other intermediate results that may have been created and/or modified by the execution of the workflow.

That is, BI users designing and/or executing a workflow may need an ability to configure and generate reports from the workflow. However, some related BI systems and/or platforms may lack a mechanism for generating a report from a workflow. Other related BI systems and/or platforms may include third-party data integration tools (e.g., PENTAHO) that may add reporting capabilities to the related BI systems and/or platforms. However, such integration tools may only provide a capability to manually generate reports. For example, a BI user may need to pause or stop execution of a workflow and manually configure and execute a report. Alternatively or additionally, the BI user may need to provide information to identify the report and/or to identify one or more sources of data to be included in the report each time the BI user manually generates the report.

As described in further detail below, various aspects of the present disclosure provide for a report connector component 180 configured to automatically generate a report during execution of a workflow. In some embodiments, the report connector component 180 may communicate with one or more services of the BI system and/or platform (e.g., workflow management service, business intelligence service, document management service) to obtain source data for the report, report configuration information, and the like. Alternatively or additionally, the report connector component 180 may communicate with the one or more services to effect the generation of the report and/or to store the generated report in a document management system.

In some embodiments, the report connector component 180 may be configured to generate reports using a previously-created report template of the BI system and/or platform. In such embodiments, the report connector component 180 may be further configured to dynamically assign run-time variable values to one or more variables of the report template. That is, the report connector component 180 may dynamically customize the report template based on the values of the run-time variables.

In some embodiments, the report connector component 180 may be configured to generate the reports based on user roles and/or workgroups defined by the BI system and/or platform. For example, the report connector component 180 may assign access permissions to the generated reports such that only users belonging to a particular set of user roles and/or workgroups may access the generated report. In another example, the report connector component 180 may only be used by users belonging to a particular set of user roles and/or workgroups.

In other embodiments, the report connector component 180 may be configured to dynamically assign identification information to the generated report, as configured by the BI user. The identification information may identify the report (e.g., report name). Alternatively or additionally, the identification information may indicate a source of the report data and/or an entity related to the report. For example, the identification information may comprise a work order identification value for reports related to work orders. In another example, the identification information may comprise a site identification value for reports related to construction of a site. That is, the identification information included in the generated report may identify the type of report and/or the content and/or object of the report.

In other embodiments, the report connector component 180 may be configured to generate the report in at least one file format. For example, the report may be generated in a portable document format (PDF), a tabular text-based format (e.g., comma-separated values (CSV)), a spreadsheet file format (e.g., MICROSOFT EXCEL), a word processing file format (e.g., MICROSOFT WORD), a graphic image file format (e.g., bitmap, portable network graphics (PNG), joint photographic experts group (JPEG)), or a combination of two or more formats. The present disclosure is not limited in this regard.

It will be apparent that various aspects of the present disclosure may provide BI users with the ability to automatically generate customized reports during execution of a workflow in a BI system and/or platform. As such, the time required to generate the reports may be reduced when compared to a time required to manually generate the reports. Further, automatic generation of the reports during execution of the workflow may be effected without a need to stop or pause execution of the workflow, and, as such, may increase efficiency of the workflow.

Figure 2:
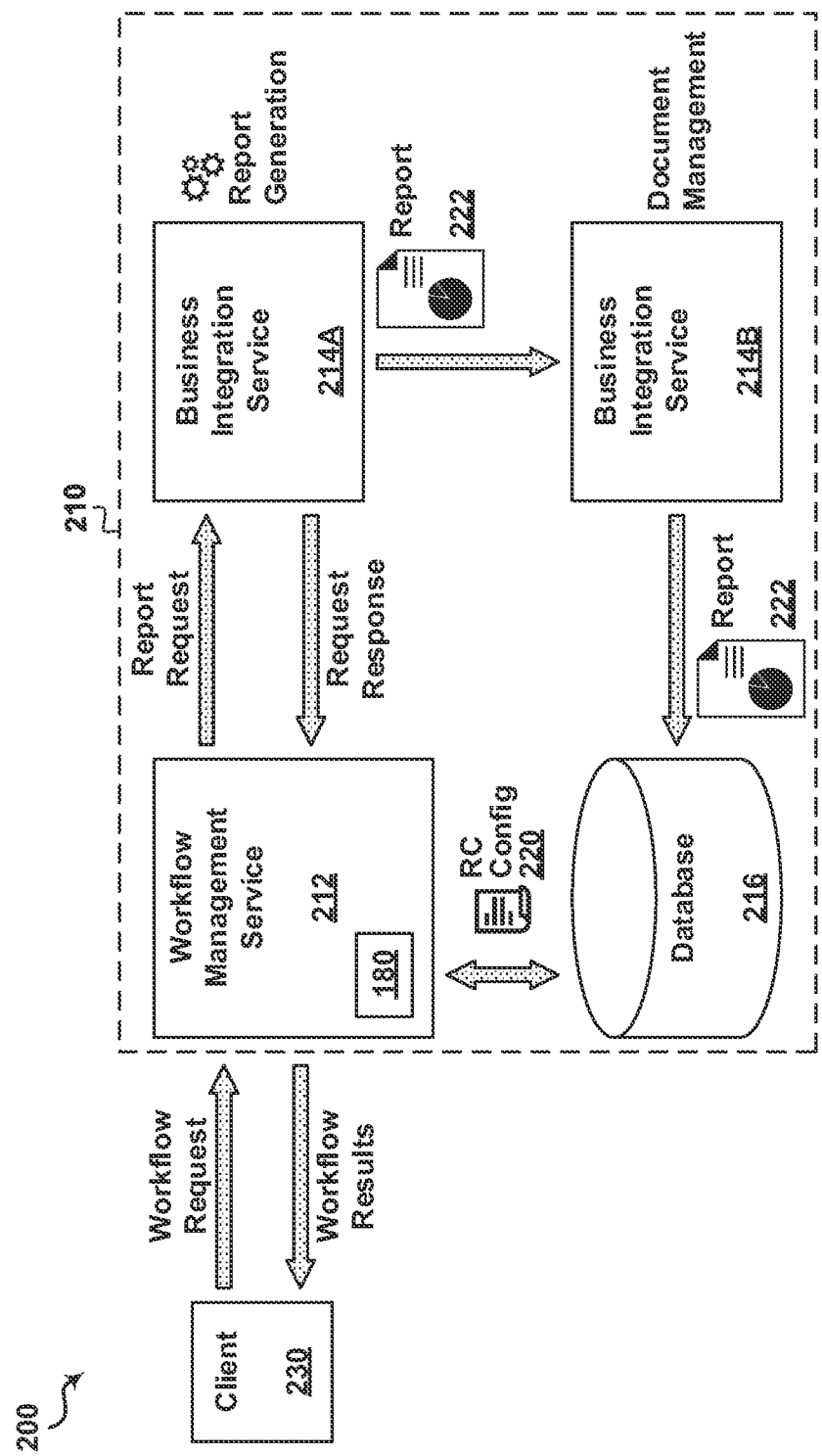
FIG. 2 illustrates an example environment for generating a report by a BI platform, in accordance with various embodiments of the present disclosure.

FIG. 2 illustrates an example environment 200 for generating a report by a BI platform 210, in accordance with various embodiments of the present disclosure. The BI platform 210 may be hosted by one or more devices 100 of FIG. 1, including the report connector component 180. Alternatively or additionally, one or more components of the BI platform 210, such as a workflow management service (WMS) 212, a first BI service 214A, a second BI Service 214B, and a database 216, may each be hosted by a distinct device 100 and may be communicatively interconnected to each other via a network (not shown).

The WMS 212 may be configured to create, modify, configure, manage, and/or execute workflows. That is, the WMS 212 may provide one or more user interfaces (UIs) through which a BI user of the BI platform 210 may create a new workflow, modify and/or configure a previously-created workflow, save/delete/rename/move workflows, and/or execute workflows. For example, the WMS 212 may comprise at least one workflow engine (e.g., CAMUNDA, BONITA BPM, ACTIVITI, ACTIVEVOS) for managing and/or executing the workflows (not shown). In some embodiments, the WMS 212 may further comprise a decision model and notation (DMN) component (not shown) for executing the workflows. Alternatively or additionally, the DMN component may be comprised by the at least one workflow engine.

The WMS 212 may provide a graphical user interface (GUI) for creating and/or modifying workflows. In some embodiments, the workflows may be depicted using business process model notation (BPMN). An example of a workflow is described in further detail in reference to FIG. 4.

In some embodiments, the WMS 212 may comprise a report connector component 180. The report connector component 180 may interact (e.g., communicate, execute) with the WMS 212 via an application programming interface (API) provided by the WMS 212 (not shown), for example. That is, the report connector component 180 may be integrated into the at least one workflow engine of the WMS 212 via the BI workflow API. Alternatively or additionally, the report connector component 180 may be configured to integrate into the WMS 212 via another signaling protocol or the like, as provided by the WMS 212 for such a purpose. The present disclosure is not limited in this regard.

The WMS 212 may allow a BI user to add one or more instances of the report connector component 180 to one or more workflows. That is, the WMS 212 may allow the BI user to automatically generate one or more reports as part of the execution flow of one or more workflows. In some embodiments, each instance of the one or more instances of the report connector component 180 may be distinctly configured. That is, each report generated by the one or more workflows may have a distinct configuration. Alternatively or additionally, one or more instances of the report connector component 180 may share a single configuration, and, as such, may generate reports with a same configuration.

The report connector component 180 may be configured to provide UI (e.g., a GUI) to obtain report connector configuration information from a user (e.g., a BI user) for one or more report connector instances in one or more workflows. For example, the report connector component 180 may display the report connector configuration UI using the BI workflow API. An example of a report connector configuration UI is described in further detail in reference to FIG. 6. In some embodiments, the report connector component 180 may create a report connector configuration 220 using the report connector configuration information from the user and may store the report connector configuration 220 in a storage area of the BI platform 210, such as a database 216.

The database 216 may comprise a single database or may comprise different logical, virtual, or physical databases, depending on a design of the BI platform 210. Alternatively or additionally, the database 216 may be implemented by one or more data processing devices, such as any type of known computer, server, or data processing device. For example, the database 216 may comprise a processor, a PC, a PCB comprising a computing device, a mini-computer, a mainframe computer, a microcomputer, a telephonic computing device, a wired/wireless computing device (e.g., a smartphone, a personal digital assistant (PDA)), a laptop, a tablet, a smart device, a wearable device, or any other similar functioning device. Those of skill in the art will appreciate that the functionality of the database 216 as described herein may be spread across multiple data processing devices, for example, to distribute processing load across multiple computers, to segregate transactions based on geographic location, user access level, quality of service (QOS), etc. The present disclosure is not limited in this regard.

In some embodiments, the BI user may access the BI platform 210 via a client device 230. That is, the BI platform 210 may receive requests and/or commands from the BI user via the client device 230 and the BI platform 210 may respond to the received requests and/or commands with workflow results, for example. Alternatively or additionally, the BI platform 210 may cause the client device 230 to display one or more UIs (e.g., GUIs) to the BI user via one or more output components (e.g., monitor, speaker) of the client device 230 and may receive input information from the user (e.g., text, UI selections and/or actions) via one or more input components (e.g., keyboard, mouse, image capturing device, microphone, etc.) of the client device 230.

The client device 230 may correspond to any type of known computer, server, or data processing device. For example, the client device 230 may comprise a processor, a PC, a PCB comprising a computing device, a mini-computer, a mainframe computer, a microcomputer, a telephonic computing device, a wired/wireless computing device (e.g., a smartphone, a PDA), a laptop, a tablet, a smart device, a wearable device, or any other similar functioning device.

In some embodiments, the BI user may create one or more workflows using, for example, one or more UIs provided to the BI user by the BI platform 210 on the client device 230. In other embodiments, the one or more workflows may include at least one instance of a report connector task. That is, the BI user may have created one or more workflows that automatically generate at least one report using the report connector component 180. For example, the BI user may have provided report connector configuration information to the report connector component 180 via a report connector configuration UI for each instance of the at least one instance of the report connector task. The report connector component 180 may have created at least one report connector configuration 220 from the report connector configuration information provided by the BI user and stored the at least one report connector configuration 220 in the database 216, for example.

The WMS 212 may determine that a workflow comprising at least one instance of the report connector task needs to be executed. In some embodiments, the WMS 212 may determine that the workflow needs to be executed based at least on a workflow request received from the client device 230 indicating that the workflow needs to be executed. The workflow request received from the client device 230 may comprise workflow identification information of the requested workflow. The identification information may comprise at least one of a workflow identification value, a work order identification value identifying a work order corresponding to the workflow, and a site identification value identifying a site corresponding to the workflow. The WMS 212 may identify the workflow that needs to be executed based at least on the workflow identification information comprised by the workflow request.

In other embodiments, the WMS 212 may determine that the workflow needs to be executed based at least on the occurrence of an event. Examples of possible events may include, but are not limited to, a time-based event that may be triggered when a particular date and/or time (e.g., Mar. 30, 2022 at 2:00 am) is reached, a workflow-based event that may be triggered by another workflow (e.g., starting execution of the other workflow, execution of a particular intermediate task of the other workflow, completion of the other workflow). The time-based events may be triggered only once at a particular date and/or time (e.g., Mar. 30, 2022 at 2:00 am), may be triggered periodically at a predetermined interval (e.g., every Wednesday at 2:00 am), and/or may be triggered aperiodically at irregular time intervals.

Alternatively or additionally, the execution of the workflow may be determined based at least on other conditions (e.g., receipt of an external message and/or signal). The present disclosure is not limited in this regard.

The WMS 212 may start execution of the workflow based on a determination that the workflow needs to be executed. During execution of the workflow, the execution flow may indicate that an instance of the report connector task needs to be executed. That is, the WMS 212 may indicate to the report connector component 180 integrated with the WMS 212 that the instance of the report connector task needs to be executed. For example, the WMS 212 may provide the indication via the BI workflow API. The report connector component 180 may determine, based on obtaining the indication, that a report corresponding to the instance of the report connector task of the workflow needs to be executed. For example, the indication provided by the WMS 212 to the report connector component 180 may comprise report identification information identifying the report corresponding to the instance of the report connector task of the workflow needs to be executed.

The report identification information may comprise at least one of a report identification value, a workflow identification value, a work order identification value identifying a work order corresponding to the workflow, and a site identification value identifying a site corresponding to the workflow. The report connector component 180 may identify the report that needs to be generated based at least on the report identification information comprised by the indication.

The report connector component 180 may obtain a report connector configuration 220 corresponding to the report that needs to be generated. For example, the report connector component 180 may access the report connector configuration 220 which may be stored in the database 216.

In some embodiments, the report connector component 180 may identify a report template that corresponds to the report connector configuration 220. For example, the report connector configuration 220 may comprise report template identification information identifying a particular report template to use for generating the report associated with the report connector configuration 220. Alternatively or additionally, the report template may have been previously-created by a BI user using a third-party data integration tool (e.g., PENTAHO).

The report connector component 180 may customize the report template using the report connector configuration 220, resulting in a customized report template. For example, the report connector component 180 may customize the report template by replacing one or more report variables of the report template with a corresponding report value according to a mapping comprised by the report connector configuration 220. That is, the report connector configuration 220 may comprise a mapping between each report variable of the report template and a corresponding report value configured by the BI user. The corresponding report values may be resolved at the time of execution of the report. As such, the report generated using the customized report template may comprise up-to-date values corresponding to the report variables according to the mapping.

In some embodiments, the report connector component 180 may assign access permissions to the report according to access permissions indicated by the report connector configuration 220. For example, the report connector component 180 may assign access permissions to the report such that only BI users belonging to a particular set of user roles and/or workgroups defined by the BI platform 210 may access the report. Alternatively or additionally, the report connector component 180 may be further configured such that only by users belonging to a particular set of user roles and/or workgroups may create and/or modify a workflow comprising the report connector component 180 and/or execute a workflow comprising the report connector component 180.

The report connector component 180 may be configured to instruct a BI service of the BI platform 210 (e.g., first BI service 214A) to generate the report using the customized report template. For example, the report connector component 180 may instruct the first BI service 214A to generate the report via the BI workflow API. Alternatively or additionally, the report connector component 180 may instruct the WMS 212 to instruct the first BI service 214A to generate the report. In other embodiments, the report connector component 180 may generate the customized report.

For example, the WMS 212 may send a report request to the first BI service 214A. The first BI service 214A may be a business integration service configured to generate a report using the customized report template. The report request may comprise the customized report template created by the report connector component 180. Alternatively or additionally, the report request may comprise location information (e.g., file address) of the customized report template and the first BI service 214A may retrieve the customized report template from the location comprised by the report request. For example, the report connector component 180 may store the customized report template in the database 216 and the first BI service 214A may retrieve the customized report template from the database 216. In other embodiments, the report request may comprise an indication of the report template corresponding to the report and separately comprise the customization data needed to customize the report template.

Based on the report request, the first BI service 214A may generate the report using the customized report template. In some embodiments, the first BI service 214A may interact (e.g., communicate) with other BI services (not shown) to generate the report.

In other embodiments, the first BI service 214A may send, to the WMS 212, request response information comprising progress status information of the report. For example, the progress status information may comprise at least one of an indication of an elapsed time generating the report, an indication of an estimated remaining time to complete generating the report, an indication of a portion of the report that has been completed, an indication of a remaining portion of the report that is not yet completed, an indication of a report section that is being generated, and error messages. The WNS 212 and/or the report connector component 180 may be configured to provide, to the client device 230, a progress status of the report based on request response information received from the first BI service 214A. For example, the WMS 212 may provide a GUI to be displayed by the client device 230 that indicates the progress status of the report (e.g., a progress bar).

Figure 7:
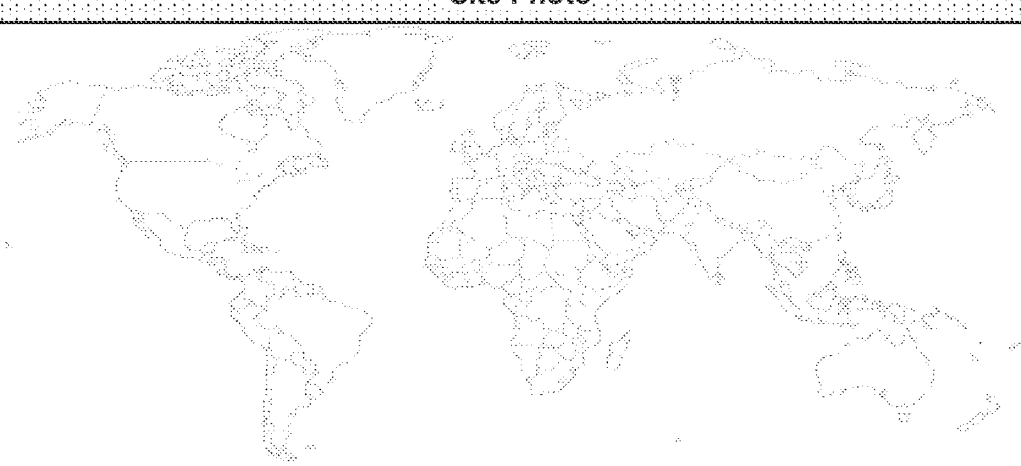
FIG. 7 is an example of a report, in accordance with various embodiments of the present disclosure.

The first BI service 214A may send to the WMS 212 a request response indicating that the report has been generated (e.g., the report generation process has completed) when the first BI service 214A has successfully completed generation of the report requested by the report request. The first BI service 214A may send the completed report 222 to a second BI service 214B for storing the completed report 222 in a managed document storage. For example, the second BI service 214B may be a document management service configured to manage a document storage. That is, the second BI service 214B may store the completed report 222 in a managed document storage, such as the database 216, for example. Alternatively or additionally, the request response sent by the first BI service 214A to the WMS 212 may comprise the completed report 222. In other embodiments, the first BI service 214A may directly store the completed report 222 in the database 216. In other embodiments, the WMS 212 may store the completed report 222 comprised by the request response in the database 216. FIG. 7 illustrates an example of a report 222, in accordance with various embodiments of the present disclosure.

Continuing to refer to FIG. 2, alternatively or additionally, the first BI service 214A may send to the WMS 212 a request response indicating that an error has occurred during generation of the report when the first BI service 214A does not successfully complete generation of the report requested by the report request.

The WMS 212 may send workflow results to the client device 230 in response to the workflow request. The workflow results may comprise the completed report 222 and/or an indication of the location of the completed report 222 in the managed document storage (e.g., database 216). The BI user may access the completed report 222 stored in the managed document storage (e.g., database 216) if the BI user belongs to at least one role or workgroup that is allowed to access the completed report 222 according to the report connector configuration 220.

In some embodiments, the WMS 212 may send workflow results to the client device 230 after execution of the workflow has completed. Alternatively or additionally, the WMS 212 may send one or more workflow results to the client device 230 during execution of the workflow. For example, the intermediate workflow results may comprise at least one of progress status information of the report generation, the completed report 222, an indication that the report generation completed successfully, and an indication that the report generation failed.

Advantageously, various aspects presented herein provides for a report connector component 180 that may provide BI users with the ability to automatically generate customized reports during execution of a workflow in the BI platform 210. As such, the time required to generate the reports may be reduced when compared to a time required to manually generate the reports. Further, automatic generation of the reports during execution of the workflow may be effected without a need to stop or pause execution of the workflow, and, as such, may increase efficiency of the workflow.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally or alternatively, a set of (one or more) components shown in FIG. 2 may perform one or more functions described as being performed by another set of components shown in FIGS. 1 and 2. In another example, the report connector component 180 may be integrated with another component shown in FIG. 2 (e.g., first BI service 214A, second BI service 214B).

Figure 3:
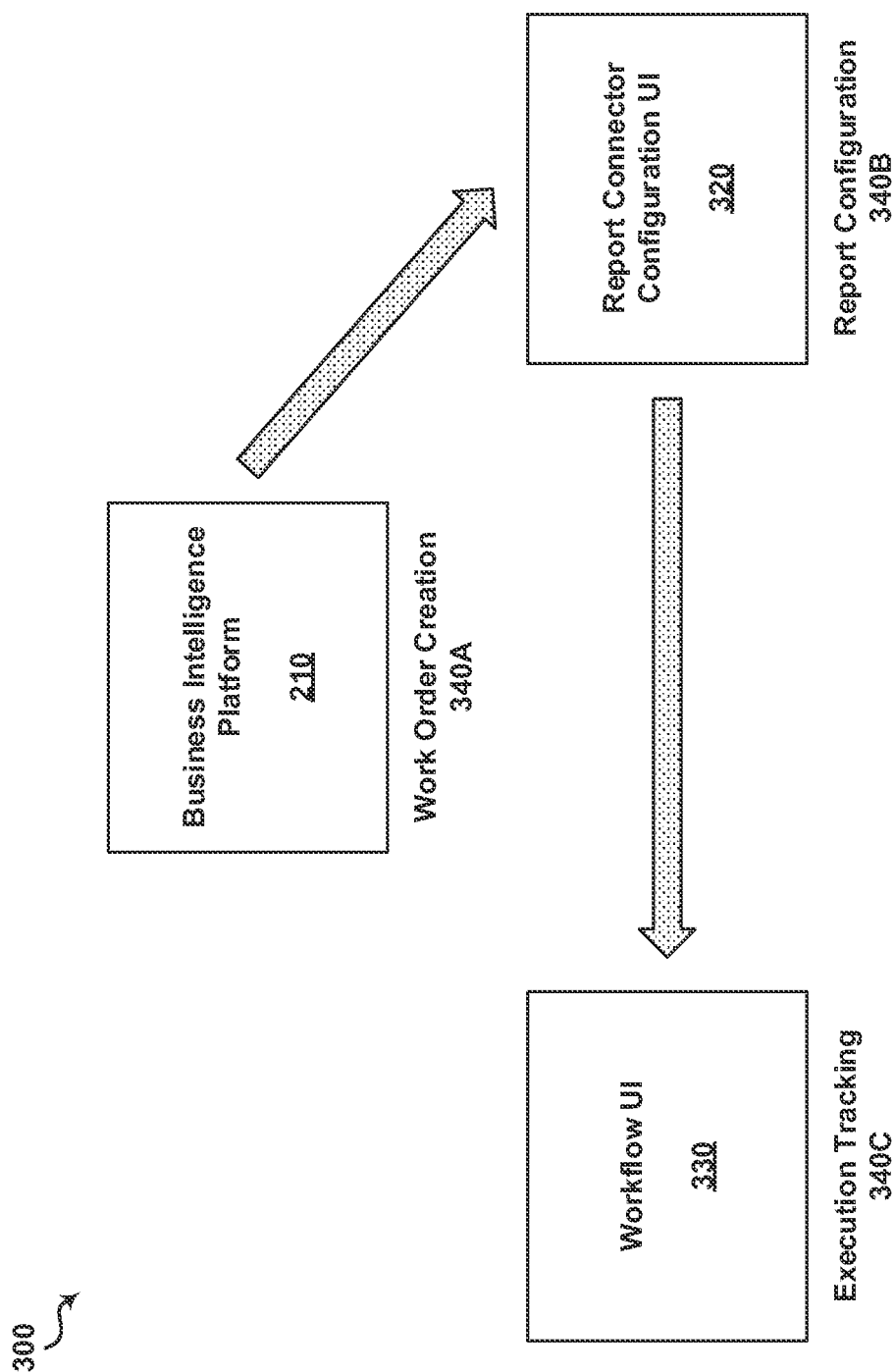
FIG. 3 is an example of a high-level flow diagram for generating a report by a BI platform, in accordance with various embodiments of the present disclosure.

FIG. 3 is an example of a high-level flow diagram 300 for generating a report 222 by a BI platform 210, in accordance with various embodiments of the present disclosure. The high-level flow diagram described in FIG. 3 may include and/or may be similar in many respects to the messages described above with reference to FIG. 1, and may include additional features not mentioned above. The high-level flow diagram 300 illustrated in FIG. 3 may be performed by the device 100 of FIG. 1, including the report connector component 180.

At 340A, the high-level flow diagram 300 may provide for the creation of a work order. For example, the BI platform 210, including the report connector component 180, may provide to at least one BI user one or more UIs (e.g., GUIs) for creating the work order. The creation of the work order may comprise creation of one or more workflows comprising at least one instance of a report connector task. Each instance of the report connector task may cause the workflow to automatically generate a report during execution of the report.

At 340B, the high-level flow diagram 300 may provide for the configuration of each instance of the at least one report connector task comprised by the one or more workflows created at 340A. For example, the report connector component 180 may provide a report connector configuration UI 320 to obtain report connector configuration information from a user (e.g., a BI user) for one or more instances of the report connector task in one or more workflows. For example, the report connector component 180 may display the report connector configuration UI 320 using the BI workflow API. An example of a report connector configuration UI is described in further detail in reference to FIG. 6. In some embodiments, the report connector component 180 may create a report connector configuration 220 using the report connector configuration information from the user and may store the report connector configuration 220 in a storage area of the BI platform 210, such as the database 216.

At 340C, the high-level flow diagram 300 may provide for tracking execution of at least one workflow created at 340A and configured at 340B. For example, the BI platform 210, with report connector component 180, may provide a workflow UI 330 that provides progress status of the execution of the at least one workflow being executed. An example of a workflow UI is described in further detail in reference to FIG. 4.

The progress status of the execution of the at least one workflow may be based on request response information received from one or more services of the BI platform 210 (e.g., the first BI service 214A). The progress status may be indicated in a text-based format (e.g., text status messages), in a graphical format (e.g., progress bar, color changes to at least a portion of the UI), and/or a combination thereof.

Alternatively or additionally, at 340C, the BI platform 210 may provide workflow results after execution of the at least one workflow has completed. For example, the workflow results may comprise at least one of progress status information of the report generation, the completed report 222, an indication that the report generation completed successfully, and an indication that the report generation failed.

It is understood that the specific order or hierarchy of blocks in the high-level flow diagram 300 disclosed in FIG. 3 is an illustration of example approaches. Based upon design preferences, it is understood that the specific order or hierarchy of blocks in the high-level flow diagram 300 may be rearranged. Further, some blocks may be combined or omitted.

Figure 4:
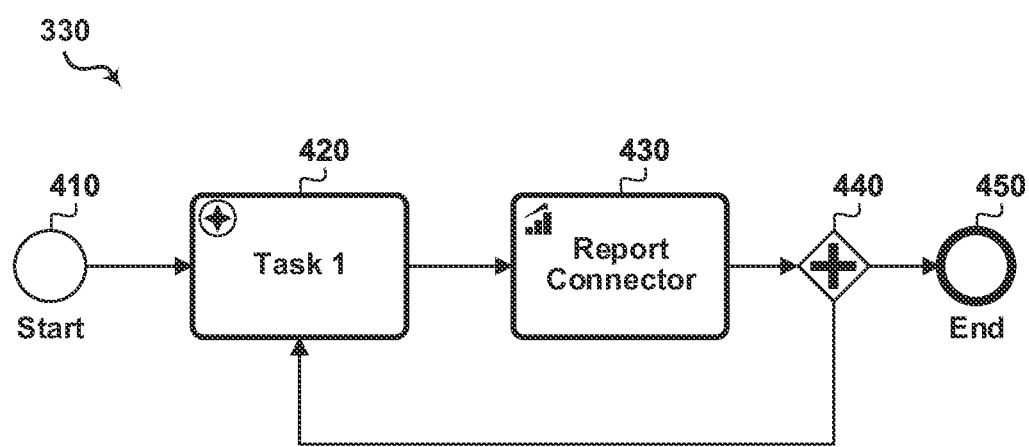
FIG. 4 illustrates an example workflow for generating a report, in accordance with various embodiments of the present disclosure.

FIG. 4 illustrates an example of a workflow 330 for generating a report 222, in accordance with various embodiments of the present disclosure. The workflow 330 depicted in FIG. 4 may be created, modified, and/or executed by the BI platform 210 of FIG. 2, that may be hosted the device 100 of FIG. 1, including the report connector component 180. The workflow 330 described in FIG. 4 may include and/or may be similar in many respects to the workflow UI 330 described above with reference to FIG. 3, and may include additional features not mentioned above.

Referring to FIG. 4, the workflow 330, which may be depicted in BPMN, shows a workflow with two tasks (e.g., 420 and 430) executed in series in a loop until a condition 440 is met. For example, at the start 410 of the workflow 330, the WMS 212 may determine that the workflow 330 needs to be executed based at least on the occurrence of an event. As described above in further detail in reference to FIG. 2, examples of possible events may include, but are not limited to, a time-based events, workflow-based events, and other conditions.

The WMS 212 may start execution of task 420 based on a determination, at 410, that the workflow 330 needs to be executed. The WMS 212 may provide progress status information during execution of the task 420. For example, the progress status of the execution of task 420 may be indicated in a text-based format (e.g., text status messages), in a graphical format (e.g., progress bar, color changes to at least a portion of the UI, such as task 420), and/or a combination thereof. For example, the WMS 212 may change the color of the UI element representing task A 420 to green when the task A 420 completes successfully.

The WMS 212 may start execution of report connector task 430 based on a determination that task A 420 has completed successfully. The WMS 212 may provide progress status information during execution of the task 430. For example, the progress status of the execution of task 430 may be indicated in a text-based format (e.g., text status messages), in a graphical format (e.g., progress bar, color changes to at least a portion of the UI, such as task 430), and/or a combination thereof. For example, the WMS 212 may change the color of the UI element representing report connector task 430 to green when the report connector task 430 completes successfully. That is, the WMS 212 may change the color when the report connector task 430 has automatically generated, using the report connector component 180, a completed report 222 customized according to a report connector configuration 220.

At 440, the WMS 212 may determine whether to return execution to task 420 or to terminate the workflow at 450 based on whether or not a condition associated with 440 has been met.

It is understood that the specific order, quantity of tasks, or arrangement of tasks in the workflow 330 disclosed in FIG. 4 is an illustration of one example approach. Based upon design preferences, it is understood that the specific order, quantity of tasks, and arrangement of tasks in the workflow 330 may be rearranged. Further, some tasks may be added, combined, or omitted.

Figure 5:
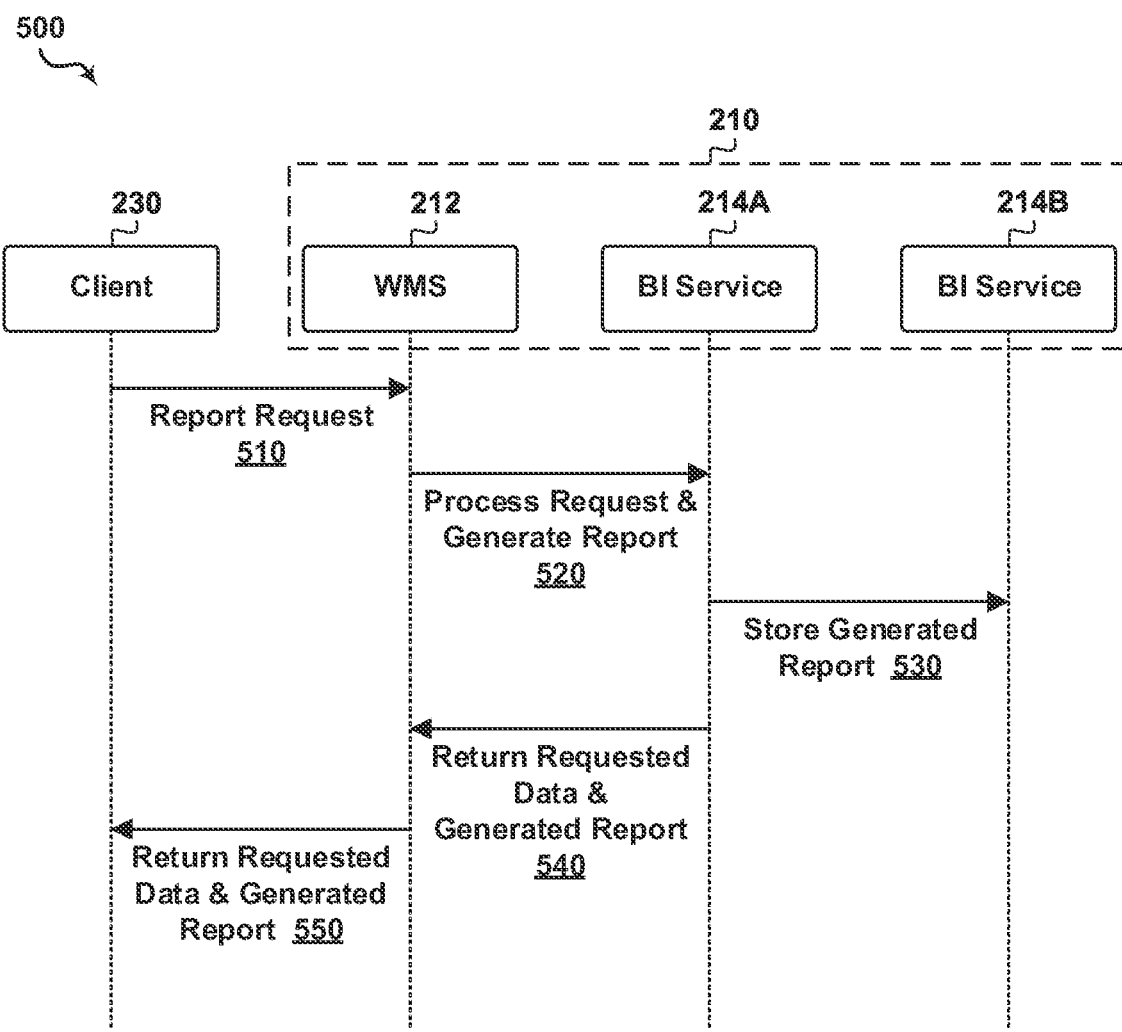
FIG. 5 is an example of a message flow diagram for generating a report, in accordance with various embodiments of the present disclosure.

FIG. 5 is an example of a message flow diagram 500 for generating a report 222, in accordance with various embodiments of the present disclosure. The message flow diagram 500 depicted in FIG. 5 may be performed by the BI platform 210 of FIG. 2, that may be hosted the device 100 of FIG. 1, including the report connector component 180, in conjunction with client device 230 of FIG. 2.

At 510, the client device 230 may send a report request to the WMS 212. In some embodiments, the report request may comprise report identification information identifying the report corresponding to an instance of a report connector task 430 of a workflow 330 that needs to be executed. The report identification information may comprise at least one of a report identification value, a workflow identification value, a work order identification value identifying a work order corresponding to the workflow, and a site identification value identifying a site corresponding to the workflow. Alternatively or additionally, the report request may comprise a request to execute a workflow 330 identified by the workflow identification value. The workflow 330 may comprise at least one instance of a report connector task 430 configured to generate a desired report.

At 520, the WMS 212 may process the report request. For example, the report connector component 180 may identify the report that needs to be generated based at least on the report identification information comprised by the received report request. As described in further detail above in reference to FIG. 2, the report connector component 180 may determine that the identified report needs to be generated, obtain a report connector configuration 220 corresponding to the identified report, identify a report template corresponding to the report connector configuration 220, customize the report template using the report connector configuration 220, and instruct a first BI service 214A to generate the report using the customized report template.

At 530, when the first BI service 214A has successfully completed generation of the report requested by the report request, the first BI service 214A may send the completed report 222 to a second BI service 214B for storing the completed report 222 in a managed document storage (e.g., database 216), as described in further detail above in reference to FIG. 2.

At 540, the first BI service 214A may send, to the WMS 212, the completed report 222 generated according to the request at 520. Alternatively or additionally, the first BI service 214A may send, to the WMS 212, additional data requested by the WMS 212 according to the request at 520. In other embodiments, the completed report 222 and/or the additional data may be sent, to the WMS 212, by the second BI service 214B (not shown).

At 550, the WMS 212 may send report generation results to the client device 230 in response to the report request at 510. The report generation results may comprise the completed report 222 and/or an indication of the location of the completed report 222 in the managed document storage (e.g., database 216), as described in further detail in reference to FIG. 2. In some embodiments, the WMS 212 may send the report generation results to the client device 230 after generation of the report has completed. Alternatively or additionally, the WMS 212 may send one or more intermediate report generation results to the client device 230 during generation of the report. For example, the intermediate report generation results may comprise at least one of progress status information of the report generation, the completed report 222, an indication that the report generation completed successfully, and an indication that the report generation failed.

It is understood that the specific order or hierarchy of messages and/or actors in the message flow diagram 500 disclosed in FIG. 5 is an illustration of example approaches. Based upon design preferences, it is understood that the specific order or hierarchy of messages and/or actors in the message flow diagram 500 may be rearranged. Further, some messages may be combined or omitted.

Figure 6:
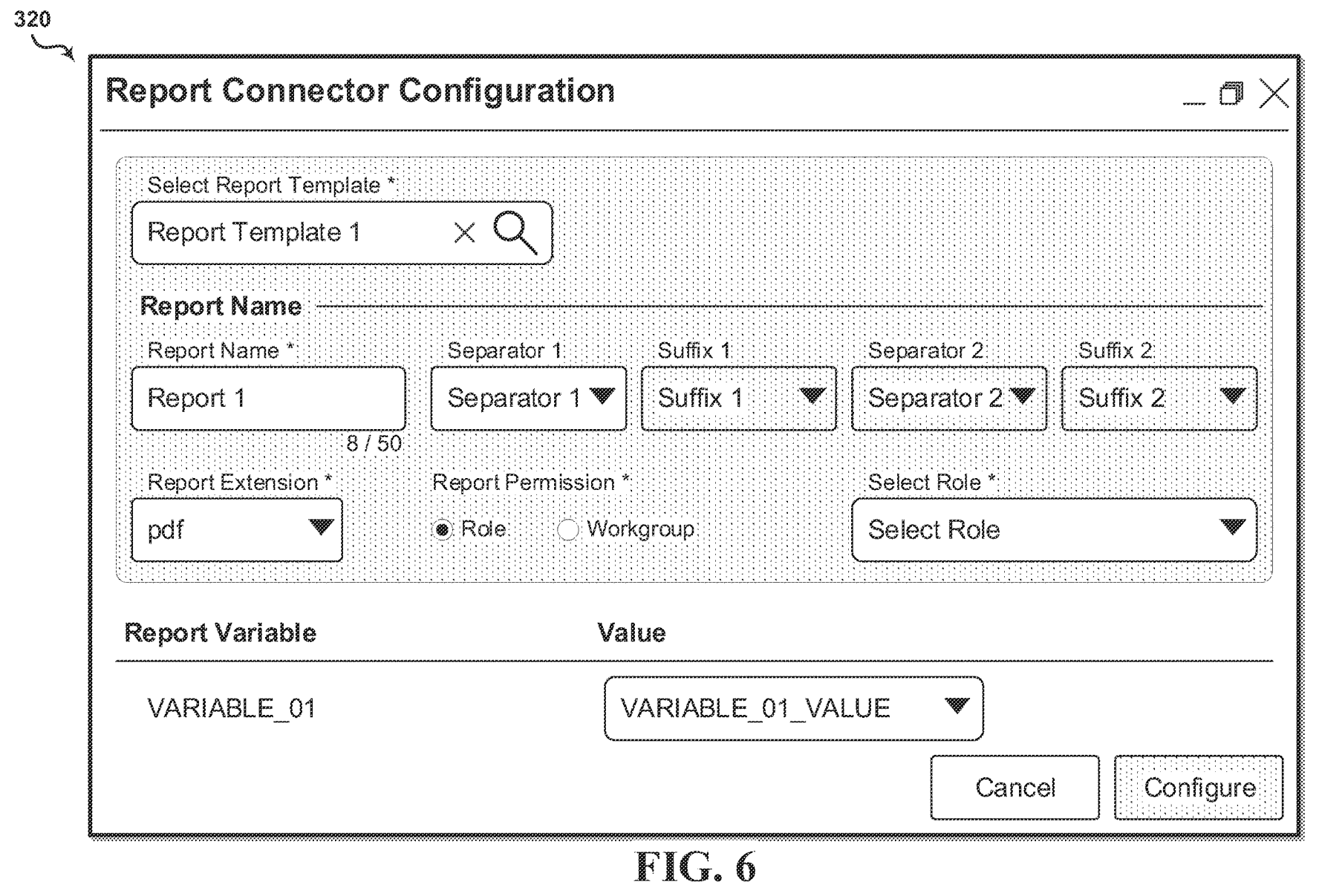

FIG. 6 is an example of a report connector configuration UI 320, in accordance with various embodiments of the present disclosure. The report connector configuration UI 320 may be provided by the BI platform 210 comprising the report connector component 180 and/or a device 100 comprising the report connector component 180. For example, the report connector configuration UI 320 may be displayed by the BI platform 210 via one or more output components of the client device 230 and/or may receive user (e.g., BI user) inputs via one or more input components of the client device 230.

As shown in FIG. 6, the report connector configuration UI 320 may allow a BI user to select a previously-created report template for generating the report. That is, the report connector component 180 may provide, via the report connector configuration UI 320, a report template list indicating report templates that are available to the workflow 330 of the BI platform 210. For example, the report connector component 180 may receive, via the report connector configuration UI 320, an indication of the selected report template from among the report templates indicated by the report template list.

Using the report connector configuration UI 320, the BI user may also configure the name of reports generated by this instance of the report connector task. The report name may comprise a base report name, and one or more separator/suffix pairs to customize report name according to the workflow and/or site from which the report was generated. The report connector configuration UI 320 may also allow a BI user to select a file format type for the report by selecting a report extension for the file name. Examples of file format types may include, but are not limited to, PDF, a tabular text-based format, a spreadsheet file format, a word processing file format, a graphic image file format, or a combination thereof. Using the report connector configuration UI 320, the BI user may also configure access permissions for the report. The access permissions may comprise one or more roles and/or workgroups of the BI platform 210 that are to be permitted to access the report.

The report connector configuration UI 320 may also allow the BI user to provide a mapping relationship between report variables of the selected report template and one or more report values. That is, the report connector component 180 may provide, via the report connector configuration UI 320, a report variable list indicating report variables of the selected report template, and corresponding lists of candidate report variable values for each report variable in the report variable list. The report connector component 180 may also provide, via the report connector configuration UI 320, a report variable list indicating report variables of the selected report template, and corresponding lists of candidate report variable values for each report variable in the report variable list.

The candidate report variable values may be a constant value (e.g., a number) provided by the user. Alternatively or additionally, the candidate report variable values may correspond to a run-time and/or environment variable of the workflow that gets resolved (into a value) during execution of the report and is inserted into the report as a replacement for the report variable. The report connector component 180 may map each report variable of the report variable list with a corresponding variable value from among the corresponding list of candidate report variable values, according to one or more selections received via the report connector configuration UI 320, as described above in reference to FIG. 2.

The BI user may click on or press the "Configure" button of the report connector configuration UI 320 to associate the provided report connector configuration information with an instance of a report connector task 430 of a workflow 330. For example, the report connector component 180 may obtain, via the report connector configuration UI 320, the report connector configuration 220 associated with the report 222. The report connector configuration 220 may comprise at least one of an indication of a selected report template, a base report name, one or more separator and suffix pairs to be appended to the base report name, a report extension type, one or more report access permissions, and one or more report variable mappings.

Advantageously, and as described in reference to FIGS. 2-7, the aspects described herein may provide for a report connector component 180 that may allow BI users to automatically generate customized reports during execution of a workflow in the BI platform 210. As such, the time required to generate the reports may be reduced when compared to a time required to manually generate the reports. Further, automatic generation of the reports during execution of the workflow may be effected without a need to stop or pause execution of the workflow, and, as such, may increase efficiency of the workflow.

Figure 8:
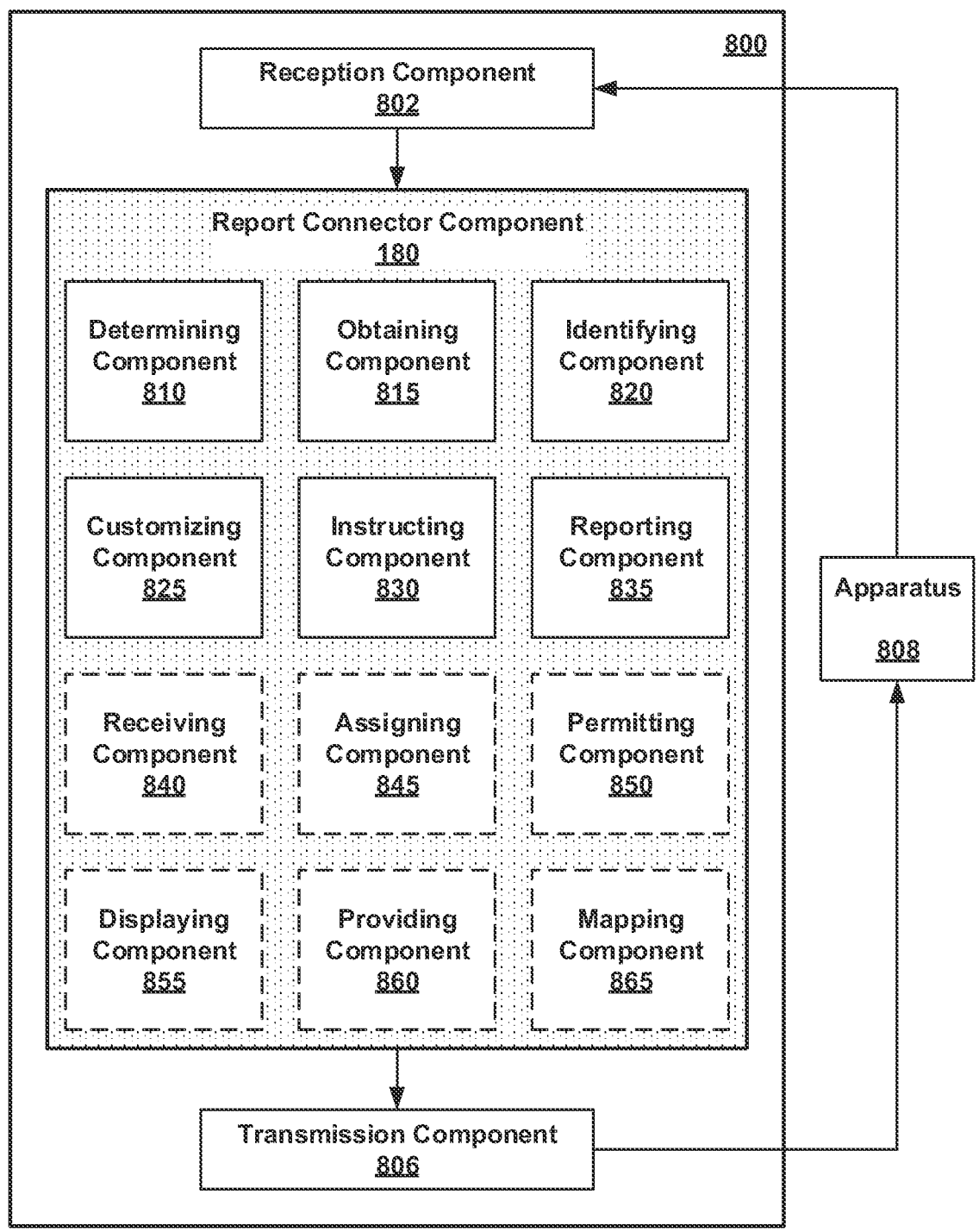
FIG. 8 is a block diagram of an example apparatus for generating a report, in accordance with various embodiments of the present disclosure.

FIG. 8 is a block diagram of an example apparatus 800 for designing datacenter facilities. The apparatus 800 may be a computing device (e.g., device 100 of FIG. 1, BI platform 210 of FIGS. 2-3 and 5) or a computing device may include the apparatus 800. In some embodiments, the apparatus 800 may include a reception component 802 configured to receive communications (e.g., wired, wireless) from another apparatus (e.g., apparatus 808), a report connector component 180 configured to generate a report, and a transmission component 806 configured to transmit communications (e.g., wired, wireless) to another apparatus (e.g., apparatus 808). The components of the apparatus 800 may be in communication with one another (e.g., via one or more buses or electrical connections). As shown in FIG. 8, the apparatus 800 may be in communication with another apparatus 808 (such as client device 230 of FIG. 2, a database, a server, or another computing device) using the reception component 802 and/or the transmission component 806.

In some embodiments, the apparatus 800 may be configured to perform one or more operations described herein in connection with FIGS. 1-7. Alternatively or additionally, the apparatus 800 may be configured to perform one or more processes described herein, such as method 900 of FIG. 9. In some embodiments, the apparatus 800 may include one or more components of the device 100 described above in connection with FIG. 1 and/or the BI platform 210 described above in connection to FIGS. 2-3 and 5.

The reception component 802 may receive communications, such as control information, data communications, or a combination thereof, from the apparatus 808 (e.g., the client device 230 of FIG. 2). The reception component 802 may provide received communications to one or more other components of the apparatus 800, such as the report connector component 180. In some aspects, the reception component 802 may perform signal processing on the received communications, and may provide the processed signals to the one or more other components. In some embodiments, the reception component 802 may include one or more antennas, a receive processor, a controller/processor, a memory, or a combination thereof, of the device 100 described above in reference to FIG. 1.

The transmission component 806 may transmit communications, such as control information, data communications, or a combination thereof, to the apparatus 808 (e.g., the client device 230 of FIG. 2). In some embodiments, the report connector component 180 may generate communications and may transmit the generated communications to the transmission component 806 for transmission to the apparatus 808. In some embodiments, the transmission component 806 may perform signal processing on the generated communications, and may transmit the processed signals to the apparatus 808. In other embodiments, the transmission component 806 may include one or more antennas, a transmit processor, a controller/processor, a memory, or a combination thereof, of the device 100 described above in reference to FIG. 1. In some embodiments, the transmission component 806 may be co-located with the reception component 802 such as in a transceiver and/or a transceiver component.

The report connector component 180 may be configured to generate a report by a WMS of a BI platform. In some embodiments, the report connector component 180 may include a set of components, such as a determining component 810 configured to determine that the report is to be generated, an obtaining component 815 configured to obtain a report connector configuration corresponding to the report, an identifying component 820 configured to identify a report template corresponding to the report connector configuration, a customizing component 825 configured to customize the report template using the report connector configuration, an instructing component 830 configured to instruct a first service to generate the report using the customized report template, and a reporting component 835 configured to report a progress status of the report based on request response information received from the first service.

Alternatively or additionally, the report connector component 180 may further include a receiving component 840 configured to receive a request to execute the workflow of the BI platform, an assigning component 845 configured to assign access permissions to the report, a permitting component 850 configured to permit, to an authorized user, access to the report stored in the managed document storage, a displaying component 855 configured to display a report connector configuration UI, a providing component 860 configured to provide a report template list and a report variable list, a mapping component 865 configured to map each report variable of the report variable list with a corresponding variable value from among the corresponding list of candidate report variable values.

In some embodiments, the set of components may be separate and distinct from the report connector component 180. In other embodiments, one or more components of the set of components may include or may be implemented within a controller/processor (e.g., the processor 120), a memory (e.g., the memory 130), or a combination thereof, of the device 100 described above in reference to FIG. 1. Alternatively or additionally, one or more components of the set of components may be implemented at least in part as software stored in a memory, such as the memory 130. For example, a component (or a portion of a component) may be implemented as computer-executable instructions or code stored in a computer-readable medium (e.g., a non-transitory computer-readable medium) and executable by a controller or a processor to perform the functions or operations of the component.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 1.

Figure 9:
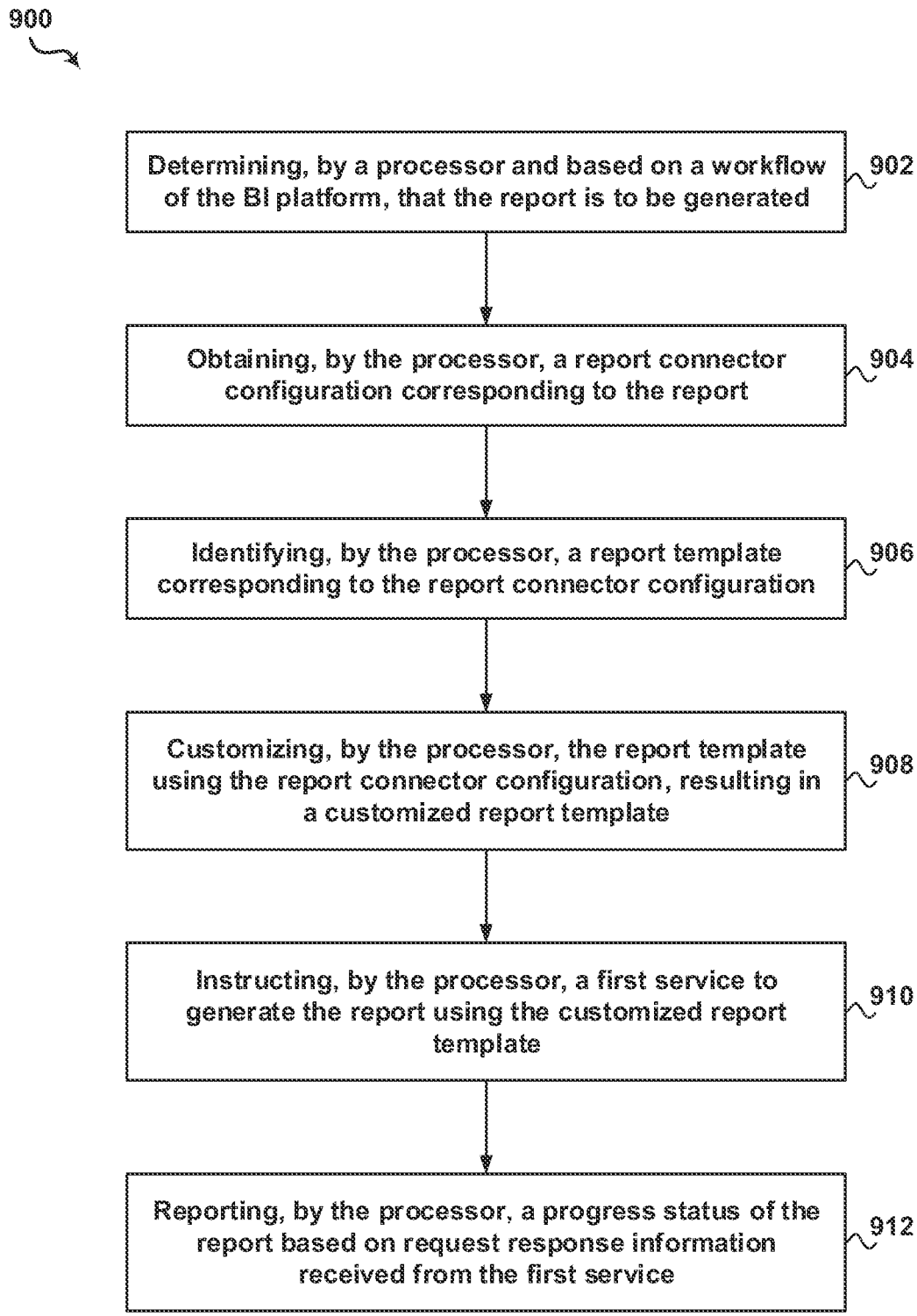
FIG. 9 is flowchart of an example method of generating a report by a WMS of a BI platform, in accordance with various embodiments of the present disclosure.

Referring to FIG. 9, in operation, a device 100 may perform a method 900 of generating a report. The method 900 may be performed by the device 100 (which may include the memory 130 and which may be the entire device 100 and/or one or more components of the device 100, such as the processor 120, the input component 150, the output component 160, the communication interface 170, and/or the report connector component 180). The method 900 may be performed by the report connector component 180 in communication with the apparatus 808 (e.g., client device 230 of FIG. 2).

At block 902 of FIG. 9, the method 900 may include determining, by a processor and based on a workflow of the BI platform, that the report is to be generated. For example, in an embodiment, the device 100, the report connector component 180, and/or the determining component 810 may be configured to or may comprise means for determining, by a processor 120 and based on a workflow 330 of the BI platform 210, that the report 222 is to be generated.

For example, the determining at block 902 may include determining, by the report connector component 180, based on obtaining an indication that an instance of a report connector task needs to be executed. That is, the WMS 212 may indicate to the report connector component 180 integrated with the WMS 212 that the instance of the report connector task needs to be executed. Alternatively or additionally, the WMS 212 may provide the indication via the BI workflow API. In some embodiments, the indication provided by the WMS 212 to the report connector component 180 may comprise report identification information identifying the report corresponding to the instance of the report connector task of the workflow needs to be executed, as described above in reference to FIG. 2.

In other optional or additional embodiments, the report identification information may comprise at least one of a report identification value, a workflow identification value, a work order identification value identifying a work order corresponding to the workflow, and a site identification value identifying a site corresponding to the workflow. In other optional or additional embodiments, the report connector component 180 may identify the report that needs to be generated based at least on the report identification information comprised by the indication.

Further, for example, the determining at block 902 may be performed to initiate the automatic generation of the report. Thus, aspects presented herein may provide for a report connector component 180 that may allow BI users to automatically generate customized reports during execution of a workflow in the BI platform 210. As such, the time required to generate the reports may be reduced when compared to a time required to manually generate the reports. Further, automatic generation of the reports during execution of the workflow may be effected without a need to stop or pause execution of the workflow, and, as such, may increase efficiency of the workflow.

In other optional or additional embodiments, the determining at block 902 may include receiving, from a client device 230, a request to execute the workflow 330 of the BI platform 210, the workflow 330 comprising a report connector task 430 corresponding to the report connector configuration 220. For example, in an embodiment, the device 100, the report connector component 180, and/or the receiving component 840 may be configured to or may comprise means for receiving, from a client device 230, a request to execute the workflow 330 of the BI platform 210, the workflow 330 comprising a report connector task 430 corresponding to the report connector configuration 220.

At block 904 of FIG. 9, the method 900 may include obtaining, by the processor, a report connector configuration corresponding to the report. For example, in an embodiment, the device 100, the report connector component 180, and/or the obtaining component 815 may be configured to or may comprise means for obtaining, by the processor 120, a report connector configuration 220 corresponding to the report 222.

For example, the obtaining at block 904 may include accessing, by the report connector component 180, the report connector configuration 220 which may be stored in the database 216, as described above in reference to FIG. 2.

Further, for example, the obtaining at block 904 may be performed to obtain the report connector configuration needed to configure and customize the automatically generated report as configured by the BI user. Thus, aspects presented herein may provide for a report connector component 180 that may allow BI users to automatically generate customized reports during execution of a workflow in the BI platform 210. As such, the time required to generate the reports may be reduced when compared to a time required to manually generate the reports. Further, automatic generation of the reports during execution of the workflow may be effected without a need to stop or pause execution of the workflow, and, as such, may increase efficiency of the workflow.

At block 906 of FIG. 9, the method 900 may include identifying, by the processor, a report template corresponding to the report connector configuration. For example, in an embodiment, the device 100, the report connector component 180, and/or the identifying component 820 may be configured to or may comprise means for identifying, by the processor 120, a report template corresponding to the report connector configuration 220.

For example, the identifying at block 906 may include identifying a particular report template to use for generating the report associated with the report connector configuration 220, based on report template identification information included in the report connector configuration 220, as described above in reference to FIG. 2. In some embodiments, the report template may have been previously-created by a BI user using a third-party data integration tool (e.g., PENTAHO).

Further, for example, the identifying at block 906 may be performed to obtain the report template needed to configure and customize the automatically generated report as configured by the BI user. Thus, aspects presented herein may provide for a report connector component 180 that may allow BI users to automatically generate customized reports during execution of a workflow in the BI platform 210. As such, the time required to generate the reports may be reduced when compared to a time required to manually generate the reports. Further, automatic generation of the reports during execution of the workflow may be effected without a need to stop or pause execution of the workflow, and, as such, may increase efficiency of the workflow.

At block 908 of FIG. 9, the method 900 may include customizing, by the processor, the report template using the report connector configuration, resulting in a customized report template. For example, in an embodiment, the device 100, the report connector component 180, and/or the customizing component 825 may be configured to or may comprise means for customizing, by the processor 120, the report template using the report connector configuration 220, resulting in a customized report template.

For example, the customizing at block 908 may include replacing one or more report variables of the report template with a corresponding report value according to a mapping comprised by the report connector configuration 220, as described above in reference to FIG. 2.

Further, for example, the customizing at block 908 may be performed to automatically generate a customized report as configured by the BI user. Thus, aspects presented herein may provide for a report connector component 180 that may allow BI users to automatically generate customized reports during execution of a workflow in the BI platform 210. As such, the time required to generate the reports may be reduced when compared to a time required to manually generate the reports. Further, automatic generation of the reports during execution of the workflow may be effected without a need to stop or pause execution of the workflow, and, as such, may increase efficiency of the workflow.

At block 910 of FIG. 9, the method 900 may include instructing, by the processor, a first service to generate the report using the customized report template. For example, in an embodiment, the device 100, the report connector component 180, and/or the instructing component 830 may be configured to or may comprise means for instructing, by the processor 120, a first BI service 214A to generate the report 222 using the customized report template.

For example, the instructing at block 910 may include instructing the first BI service 214A to generate the customized report via the BI workflow API, as described above in reference to FIG. 2. In some embodiments, the report connector component 180 may instruct the WMS 212 to instruct the first BI service 214A to generate the report.

Further, for example, the instructing at block 910 may be performed to automatically generate the customized report as configured by the BI user. Thus, aspects presented herein may provide for a report connector component 180 that may allow BI users to automatically generate customized reports during execution of a workflow in the BI platform 210. As such, the time required to generate the reports may be reduced when compared to a time required to manually generate the reports. Further, automatic generation of the reports during execution of the workflow may be effected without a need to stop or pause execution of the workflow, and, as such, may increase efficiency of the workflow.

In other optional or additional embodiments, the instructing at block 910 may include instructing a second BI service 214B to store the report 222 in a managed document storage 216.

In other optional or additional embodiments, the instructing at block 910 may include permitting, to an authorized user, access to the report stored in the managed document storage, the authorized user being determined according to access permissions indicated by the report connector configuration. For example, in an embodiment, the device 100, the report connector component 180, and/or the permitting component 850 may be configured to or may comprise means for permitting, to an authorized user, access to the report 222 stored in the managed document storage 216, the authorized user being determined according to access permissions indicated by the report connector configuration 220.

At block 912 of FIG. 9, the method 900 may include reporting, by the processor, a progress status of the report based on request response information received from the first service. For example, in an embodiment, the device 100, the report connector component 180, and/or the reporting component 835 may be configured to or may comprise means for reporting, by the processor 120, a progress status of the report 222 based on request response information received from the first BI service 214A.

For example, the request response information at block 912 may include progress status information comprising at least one of an indication of an elapsed time generating the report, an indication of an estimated remaining time to complete generating the report, an indication of a portion of the report that has been completed, an indication of a remaining portion of the report that is not yet completed, an indication of a report section that is being generated, and error messages.

In some embodiments, the reporting at block 912 may include sending, by the report connector component 180 via the WMS 212, workflow results to the client device 230 after generation of the report has completed. In other optional or additional embodiments, the reporting at block 912 may include sending, by the report connector component 180 via the WMS 212, one or more workflow results to the client device 230 during execution of the workflow. For example, the intermediate workflow results may comprise at least one of progress status information of the report generation, the completed report 222, an indication that the report generation completed successfully, and an indication that the report generation failed.

Further, for example, the reporting at block 912 may be performed to provide the completed report 222 to the BI user requesting the generation of the report. Thus, aspects presented herein may provide for a report connector component 180 that may allow BI users to automatically generate customized reports during execution of a workflow in the BI platform 210. As such, the time required to generate the reports may be reduced when compared to a time required to manually generate the reports. Further, automatic generation of the reports during execution of the workflow may be effected without a need to stop or pause execution of the workflow, and, as such, may increase efficiency of the workflow.

In optional or additional embodiments that may be combined with any other embodiment, the method 900 may include assigning access permissions to the report according to access permissions indicated by the report connector configuration. For example, in an embodiment, the device 100, the report connector component 180, and/or the assigning component 845 may be configured to or may comprise means for assigning access permissions to the report according to access permissions indicated by the report connector configuration.

In optional or additional embodiments that may be combined with any other embodiment, the method 900 may include displaying, via a workflow design user interface UI of the BI platform, a report connector configuration UI, and obtaining, via the report connector configuration UI, the report connector configuration associated with the report, the report connector configuration comprising at least one of an indication of a selected report template, a base report name, one or more separator and suffix pairs to be appended to the base report name, a report extension type, one or more report access permissions, and one or more report variable mappings.

In optional or additional embodiments that may be combined with any other embodiment, the method 900 may include providing, via the report connector configuration UI, a report template list indicating report templates that are available to the workflow of the BI platform, receiving, via the report connector configuration UI, the indication of the selected report template from among the report templates indicated by the report template list, providing, via the report connector configuration UI, a report variable list indicating report variables of the selected report template, and corresponding lists of candidate report variable values for each report variable in the report variable list, and mapping each report variable of the report variable list with a corresponding variable value from among the corresponding list of candidate report variable values, according to one or more selections received via the report connector configuration UI.

The foregoing disclosure provides illustration and description, but is not intended to be exhaustive or to limit the implementations to the precise form disclosed. Modifications and variations are possible in light of the above disclosure or may be acquired from practice of the implementations.

It is understood that the specific order or hierarchy of blocks in the processes/flowcharts disclosed herein is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method of generating a report by a workflow management service (WMS) of a business intelligence (BI) platform, comprising:
    displaying, by a processor, a report connector configuration user interface (UI) to a user, wherein the report connector configuration UI comprises a report template list indicating report templates that are available to a workflow of the BI platform and are selectable by the user;
    receiving, by the processor and from the user via the report connector configuration UI, a selection of a report template from among the report templates indicated by the report template list;
    receiving, by the processor and from the user via the report connector configuration UI, a report connector configuration of the selected report template;
    determining, by the processor and based on the workflow of the BI platform, that the report is to be generated;
    customizing, by the processor, the report template selected by the user using the report connector configuration received from the user, resulting in a customized report template;
    instructing, by the processor, a first service to generate the report using the customized report template; and
    reporting, by the processor, a progress status of the report based on request response information received from the first service.

2. The method of claim 1, wherein determining that the report is to be generated comprises:
    receiving, from a client device, a request to execute the workflow of the BI platform, the workflow comprising a report connector task corresponding to the report connector configuration.

3. The method of claim 1, further comprising:
    assigning access permissions to the report according to access permissions indicated by the report connector configuration.

4. The method of claim 1, wherein instructing the first service to generate the report comprises:
    instructing a second service to store the report in a managed document storage.

5. The method of claim 4, further comprising:
    permitting, to an authorized user, access to the report stored in the managed document storage, the authorized user being determined according to access permissions indicated by the report connector configuration.

6. The method of claim 1, wherein the displaying the report connector configuration UI comprises: displaying, via a workflow design UI of the BI platform, the report connector configuration UI, and wherein the report connector configuration comprises at least one of an indication of the selected report template, a base report name, one or more separator and suffix pairs to be appended to the base report name, a report extension type, one or more report access permissions, and one or more report variable mappings.

7. The method of claim 6, wherein the receiving the report connector configuration comprises:
    providing, via the report connector configuration UI, a report variable list indicating report variables of the selected report template, and corresponding lists of candidate report variable values for each report variable in the report variable list; and
    mapping each report variable of the report variable list with a corresponding variable value from among the corresponding list of candidate report variable values, according to one or more selections received via the report connector configuration UI.

8. An apparatus for generating a report by a workflow management service (WMS) of a business intelligence (BI) platform, comprising:
    a memory storage storing computer-executable instructions; and
    a processor communicatively coupled to the memory storage, wherein the processor is configured to execute the computer-executable instructions and cause the apparatus to:
    display a report connector configuration user interface (UI) to a user, wherein the report connector configuration UI comprises a report template list indicating report templates that are available to a workflow of the BI platform and are selectable by the user;
    receive, from the user via the report connector configuration UI, a selection of a report template from among the report templates indicated by the report template list;
    receive, from the user via the report connector configuration UI, a report connector configuration of the selected report template;
    determine, based on the workflow of the BI platform, that the report is to be generated;

customize the report template selected by the user using the report connector configuration received from the user, resulting in a customized report template;

instruct a first service to generate the report using the customized report template; and report a progress status of the report based on request response information received from the first service.

9. The apparatus of claim 8, wherein the computer-executable instructions to determine that the report is to be generated further cause the apparatus to:

receive, from a client device, a request to execute the workflow of the BI platform, the workflow comprising a report connector task corresponding to the report connector configuration.

10. The apparatus of claim 8, wherein the computer-executable instructions, when executed by the processor, further cause the apparatus to:

assign access permissions to the report according to access permissions indicated by the report connector configuration.

11. The apparatus of claim 8, wherein the computer-executable instructions to instruct the first service to generate the report further cause the apparatus to:

instruct a second service to store the report in a managed document storage.

12. The apparatus of claim 11, wherein the computer-executable instructions when executed by the processor, further cause the apparatus to:

permit, to an authorized user, access to the report stored in the managed document storage, the authorized user being determined according to access permissions indicated by the report connector configuration.

13. The apparatus of claim 8, wherein the computer-executable instructions, when executed by the processor, further cause the apparatus to display the report connector configuration UI by: displaying, via a workflow design UI of the BI platform, the report connector configuration UI, and wherein the report connector configuration comprises at least one of an indication of the selected report template, a base report name, one or more separator and suffix pairs to be appended to the base report name, a report extension type, one or more report access permissions, and one or more report variable mappings.

14. The apparatus of claim 13, wherein the computer-executable instructions, when executed by the processor, further cause the apparatus to receive the report connector configuration by:

providing, via the report connector configuration UI, a report variable list indicating report variables of the selected report template, and corresponding lists of candidate report variable values for each report variable in the report variable list; and mapping each report variable of the report variable list with a corresponding variable value from among the corresponding list of candidate report variable values, according to one or more selections received via the report connector configuration UI.

15. A non-transitory computer-readable storage medium having recorded thereon a program for generating a report that is executable by a workflow management service (WMS) of a business intelligence (BI) platform, the program comprising operations to:

display a report connector configuration user interface (UI) to a user, wherein the report connector configuration UI comprises a report template list indicating report templates that are available to a workflow of the BI platform and are selectable by the user;

receive, from the user via the report connector configuration UI, a selection of a report template from among the report templates indicated by the report template list;

receive, from the user via the report connector configuration UI, a report connector configuration of the selected report template;

determine, based on the workflow of the BI platform, that the report is to be generated;

customize the report template selected by the user using the report connector configuration received from the user, resulting in a customized report template;

instruct a first service to generate the report using the customized report template; and report a progress status of the report based on request response information received from the first service.

16. The non-transitory computer-readable storage medium of claim 15, wherein the operations to determine that the report is to be generated comprise further operations to:

receive, from a client device, a request to execute the workflow of the BI platform, the workflow comprising a report connector task corresponding to the report connector configuration.

17. The non-transitory computer-readable storage medium of claim 15, wherein the operations to instruct the first service to generate the report comprise further operations to:

instructing a second service to store the report in a managed document storage.

18. The non-transitory computer-readable storage medium of claim 17, wherein the program comprises further operations to:

permit, to an authorized user, access to the report stored in the managed document storage, the authorized user being determined according to access permissions indicated by the report connector configuration.

19. The non-transitory computer-readable storage medium of claim 15, wherein the program comprises further operations to display the report connector configuration UI by: displaying, via a workflow design UI of the BI platform, the report connector configuration UI, wherein the report connector configuration comprises at least one of an indication of the selected report template, a base report name, one or more separator and suffix pairs to be appended to the base report name, a report extension type, one or more report access permissions, and one or more report variable mappings.

20. The non-transitory computer-readable storage medium of claim 19, wherein the program comprises further operations to display the report connector configuration UI by:

providing, via the report connector configuration UI, a report variable list indicating report variables of the selected report template, and corresponding lists of candidate report variable values for each report variable in the report variable list; and mapping each report variable of the report variable list with a corresponding variable value from among the corresponding list of candidate report variable values, according to one or more selections received via the report connector configuration UI.

* * * * *